(12) United States Patent
Ren

(10) Patent No.: US 7,712,074 B2
(45) Date of Patent: May 4, 2010

(54) AUTOMATING INTERACTIONS WITH SOFTWARE USER INTERFACES

(76) Inventor: Bing Ren, 6809 SW. Wilsonville Rd., #82, Wilsonville, OR (US) 97070

( * ) Notice: Subject to any disclaimer, the term of this patent is extended or adjusted under 35 U.S.C. 154(b) by 1011 days.

(21) Appl. No.: 10/302,453

(22) Filed: Nov. 21, 2002

(65) Prior Publication Data
US 2004/0100502 A1    May 27, 2004

(51) Int. Cl.
*G06F 9/44* (2006.01)
*G06F 3/00* (2006.01)

(52) U.S. Cl. .................. 717/105; 717/125; 715/700

(58) Field of Classification Search .......... 717/125, 717/124, 164
See application file for complete search history.

(56) References Cited

U.S. PATENT DOCUMENTS

| | | | | |
|---|---|---|---|---|
| 6,046,740 | A * | 4/2000 | LaRoche et al. | 715/764 |
| 6,115,719 | A * | 9/2000 | Purdy et al. | 707/103 R |
| 6,698,012 | B1 * | 2/2004 | Kossatchev et al. | 717/126 |
| 6,901,588 | B1 * | 5/2005 | Krapf et al. | 717/164 |
| 7,000,224 | B1 * | 2/2006 | Osborne et al. | 717/125 |
| 7,165,240 | B2 * | 1/2007 | Patterson | 717/116 |
| 7,210,117 | B2 * | 4/2007 | Kudukoli et al. | 717/100 |
| 7,272,822 | B1 * | 9/2007 | Riggins et al. | 717/124 |
| 2002/0078255 | A1 * | 6/2002 | Narayan | 709/316 |
| 2003/0084429 | A1 * | 5/2003 | Schaefer | 717/125 |

OTHER PUBLICATIONS

"Coverage criteria for GUI testing", Memon et al., Sep. 2001, pp. 256-267. Online retrieved at <http://delivery.acm.org/10.1145/510000/503244/p256-memon.pdf>.*
"An automated oracle for verifying GUI objects", Takahashi, Jul. 2001, pp. 83-88. Online retrieved at <http://delivery.acm.org/10.1145/510000/505494/p83-takahashi.pdf>.*
"The state of the art in automating usability evaluation of user interfaces", Ivory et al., Dec. 2001, pp. 470-516. Online retrieved at <http://delivery.acm.org/10.1145/510000/503114/p470-ivory.pdf>.*
"User-based testing of GUI sequences and their interactions", White et al., Nov. 2001, pp. 54-63. Online retrieved at <http://ieeexplore.ieee.org/stamp/stamp.jsp?tp=&arnumber=989458&isnumber=21326>.*

* cited by examiner

*Primary Examiner*—Tuan Q Dam
*Assistant Examiner*—Thuy Dao
(74) *Attorney, Agent, or Firm*—Klarquist Sparkman, LLP

(57) ABSTRACT

A method and apparatus applies an action to a software application by determining a target object for the input action. The determination of the target object is performed by identifying the target object through socially identifying object information relative to a reference object. Then, the input action is applied to the target object.

12 Claims, 16 Drawing Sheets

```xml
<testCase>
  <case name = "Login" window = "Quickuse Login">
    <action type = "JTextField" testDomain = "user" action = "Key Input" input = "root">
      <signature>
        <parent type = "JDialog" />
        <peer rank = "1" num_siblings = "2" />
        <label hasLabel = "yes" labelName = "Username:" labelPosition = "west">
      </signature>
    </action>
    <action type = "JPasswordField" testDomain = "password" action = "Key Input" input = "qdsroot">
      <signature>
        <parent type = "JDialog" />
        <peer rank = "1" num_siblings = "2" />
        <label hasLabel = "yes" labelName = "Password:" labelPosition = "west">
      </signature>
    </action>
    <action type = "JTextField" testDomain = "server" action = "Key Input" input = "root">
      <signature>
        <parent type = "JDialog" />
        <peer rank = "2" num_siblings = "2" />
        <label hasLabel = "yes" labelName = "Server:" labelPosition = "west">
      </signature>
    </action>
  </case>
  ...
```

Figure 8

```
<TestData>
        .
        .
        .
        <testSuite>
                <case target = "Login" />              910
                <case target = "New Component" />      920
                <case target = "Reopen" />             930
                <case target = "Search" />             940
                <case target = "Exit" />               950
        </testSuite>
</TestData>
```

Figure 9

```
<TestData>
    .
    .
    .
    <testSuite>
        <case target = "New Component" />         1120
        <case target = "Reopen" />
        <case target = "Search" />
        <case target = "Exit" />
    </testSuite>

</TestData>
```

Figure 11

```xml
<case name = "New Component" window = "Quickuse Development System" depends ={1210}"Login">

<action type="javax.swing.JMenuItem" name="Component" testDomain="Web|New|Component"
        action = "mouse left one click" actionString = "">
                    {1202}
<signature>

<description textUnique = "no" hasIcon = "no" iconDescription = "" hasToolTip = "no"
             toolTipText ="" special =""/>

<parent type= "javax.swing.JMenuBar" parentName = "" />

<sibling numSiblings = "" rank = "" />

<label hasLabel = "no" labelText = "" labelPosition =""/>

<selection needSelection = "no" selectionTextTree = "" others = "" />

</signature>
</action>
```

AUTOMATING INTERACTIONS WITH SOFTWARE USER INTERFACES

FIELD OF THE INVENTION

The present invention pertains to the field of application software interfaces. More specifically the invention pertains to improving automated interactions with user interfaces to software applications.

BACKGROUND OF THE INVENTION

In normal usage, software applications interact with other systems or users. This interaction can occur through Input/Output (I/O) devices coupled with a hardware device running the software application or as communications from other software applications. The I/O devices provide information from a variety of sources including networking devices, machinery controlled by the software applications, and hardware devices used by users of a system to facilitate data input and output to and from the system. Examples of such hardware devices are keyboards, displays and mice. These hardware devices are for real-time input and output of typed and graphical information with a software application.

There are times when real time user interaction with a software application is not desired. Reasons for this include the error prone nature of user interaction as well as the high cost of providing users to operate software. Thus, it is desirable to automate the operation of software applications in certain environments.

For example, as software applications are developed or troubleshot, changes are made to the software application. After these changes are made, it is frequently desirable to test the software application's functionality using such techniques as regression and functional testing to ensure that, as a result of the changes made, other aspects of the operation of the software application have not been adversely affected. To ensure the repeatability of the results of such testing, it is desirable to automate the process of performing regression and functional testing.

In addition to automating software testing, there are several other uses for removing real time interaction with software applications. For example, when developing a product demonstration for use in trade shows, it is desirable to be able to have a product perform an automated execution of a software application, without requiring user attendance, to provide a canned demonstration of the software application. Another example where automated operation of a software application is desirable is in the testing of systems by remote means. By executing locally stored tests from a remote machine, a remote user can determine potential problems with a local software application. A plethora of other scenarios exist where the automated interaction with a software application is desirable.

Currently, methods for automating the interaction with user interfaces of software applications operate by indicating pixel locations on a screen for an input action to be applied to the software application. First, while a user interacts with the software application, a separate recording application will record screen locations, in pixels, of mouse/key actions made by the user. Examples of such actions are mouse moves, mouse presses, mouse releases, mouse clicks and key actions such as presses or releases. This pixel and action information is stored in files in the system containing the software application. Then, during playback of these files by a replay application, the replay application follows the stored pixel information and applies the appropriate actions at the appropriate pixel location as indicated by the stored values. The underlying assumption in this method is that screen locations of programs/applications during playback will be the same screen locations as they were during the record stage. However, this is not necessarily the case. For example, when an application playback is performed by a different machine than the machine with which the record was performed, which uses a different display resolution, the actual software location on the screen may be at a different pixel location. This will likely cause an error to occur during the playback as an input action is applied to an incorrect window in the software application.

BRIEF DESCRIPTION OF THE DRAWINGS

Examples of the present invention are illustrated in the accompanying drawings. The drawings do not, however, limit the scope of the present invention. Similar references in the drawings indicate similar elements.

FIG. 8 illustrates an exemplary script file for providing the necessary information for performing the automated interaction, in accordance with one embodiment.

FIG. 9 illustrates an exemplary testing suite that is comprised of multiple test cases in accordance with one embodiment.

FIG. 11 illustrates an exemplary testing suite that is comprised of multiple test cases in accordance with one embodiment.

FIG. 12 illustrates a portion of a script file in accordance with one embodiment.

DETAILED DESCRIPTION

Figure 1:
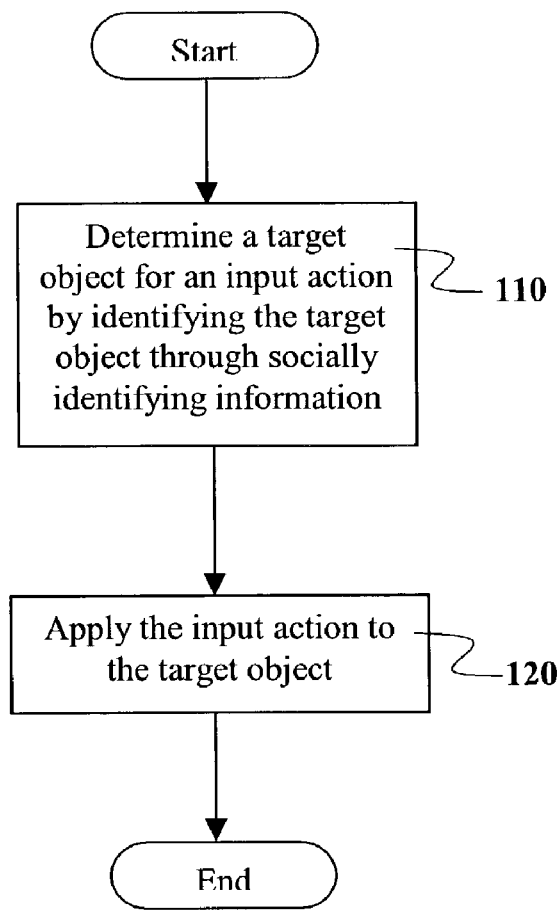
FIG. 1 illustrates a flow diagram for applying actions, in accordance with one embodiment.

Methods for improving the automated interactions with a component-based user interface application are described below. In the following description, for purposes of explanation, specific numbers, materials and configurations are set forth in order to provide a thorough understanding of the present invention. However, it will be apparent to one skilled in the art that the present invention may be practiced without those specific details. In other instances, well-known features are omitted or simplified in order not to obscure the present invention. Further, the phrase "in one embodiment" is used repeatedly. In general, the phrase "in one embodiment" does not refer to the same embodiment although it may. The terms "comprising", "including", and "having", as used herein, are synonymous. Finally, while the present invention is explained with respect to a Java virtual machine-based user interface, the present invention is applicable to any component-based user interface application, such as those developed using Visual-Basic and Visual-C++.

Overview

The present invention improves automated interactions with a component-based graphical user interface (GUI). In various embodiments, the present invention determines "social relationships" among objects in a GUI. Thus, given a reference object, social relationships to this reference object may be used to identify a target object for a particular automated interaction. As an example, being provided a top level component in a Java-based GUI application as a reference object, and social relationship information relative to this top level component, it is possible to identify a target Java component. Note that in Java, the "object" are "components". The target Java component is the component to which a desired action is to be performed. Thus, a top level component is provided as a starting point for the identification. Next, socially identifying information which includes information regarding a target object's relationship to the top level component is obtained. The socially identifying information is used to identify uniquely the target component by identifying the target component relative to other components, including possibly the top component itself, in existence in the top level component. When the proper target component is identified, an action is then applied to the target component.

In contrast, as previously alluded to, prior approaches to automated interaction used pixel counts to identify the locations where input actions to a software application are to occur. Pixel-based locations, however, tend to be unreliable over time and from system to system. The present invention is not dependent upon pixel locations. Rather, the present invention identifies target objects from a software application itself and, therefore, does not have the problems associated with the prior pixel-based approaches.

In an exemplary embodiment, user interactions with a GUI are captured and recorded to a file. Each recorded interaction includes socially descriptive information identifying the target component for the respective interaction. An example of recorded user interactions might include a recordation of the login sequence of a user to an NT workstation. In such a case, the present invention would thus record the mouse clicks and keystrokes executed by the user logging in to the workstation. Alternatively, a user may manually create an interactions file to be applied to target components along with the appropriate socially descriptive information to identify the respective target components.

In either case, another part of the invention is used to read the interactions file, determine the appropriate target components for the respective interactions based upon the socially descriptive information, and then apply the interactions to the target components. For example, using the interactions file, the present invention can identify a particular text field in a GUI window, enter text in the text field, then identify a "submit" button in the GUI window next to the text field, and enter a mouse click on the "submit" button, just as if a user had entered the interactions in real time.

Recording Information

Generating interactions files, also known as script files, for use by the methods to automate the interaction with the software applications can be an automated process itself. As previously mentioned there are several ways of obtaining the script files for use in the playback role (e.g. playing back the actions recorded in the script files). A user could, for example, manually develop these script files after becoming familiar with the syntax of the script files. However, as manually writing files can be a laborious, time-consuming process, it is desirable to provide a user of the system with an ability to capture a set of movements, or interactions, and have them recorded directly to a script file. For example, it would be desirable to have a tool automatically generate the sequence of actions to enable a user to perform a login of the system as described subsequently in connection with FIG. 8. In one embodiment, a systemEventWQueue is maintained that contains information on every event. Included in the information on the event is an id for the component to which the event will apply. Having the component id to which the action is applied, its signature information; such as type, parent type, information on its peers; are easily determined. The automated recording script can use the appropriate name and/or signature information to generate the appropriate script file.

Applying Actions to Target Components

In a typical component-based graphical user interface (GUI), components, or objects, may include windows, text fields, action buttons, menus, menu items, hyperlinks, or any number of other interactive objects. These objects are often organized in a hierarchy. For instance, the highest level of the hierarchy may be a single window, referred to as a "desktop" in some operating systems. That window may include one or more interactive objects, such as sub-windows, at the second level of the hierarchy. Some of those objects may include more objects at the third level of the hierarchy, which may include more objects at the fourth level. Objects at each level may include sub-objects at the next lower level. The hierarchy may include many levels. At any instant in time, a user may be able to display only a small part of the entire hierarchy.

As part of the task of determining an object to which an action is to be applied, the scripting files that were created manually or with the aid of a utility, as previously discussed, are read. FIG. 1 illustrates a flow diagram for applying actions to objects, in accordance with one embodiment. As part of the procedure, information associated with an input action is obtained, at 110. In one embodiment, this information is read from a interactions file specified by the user. The information contains socially identifying information associated with a target object for the input action. Socially-identifying information is information that uniquely describes a target object within a GUI either directly, for instance, by name, or indirectly in terms of the object's relationship to other objects. Examples of other objects include ancestral objects, peer objects and descendant objects. After a target object has been identified, an input action is applied to the target object, at 120

Figure 2:
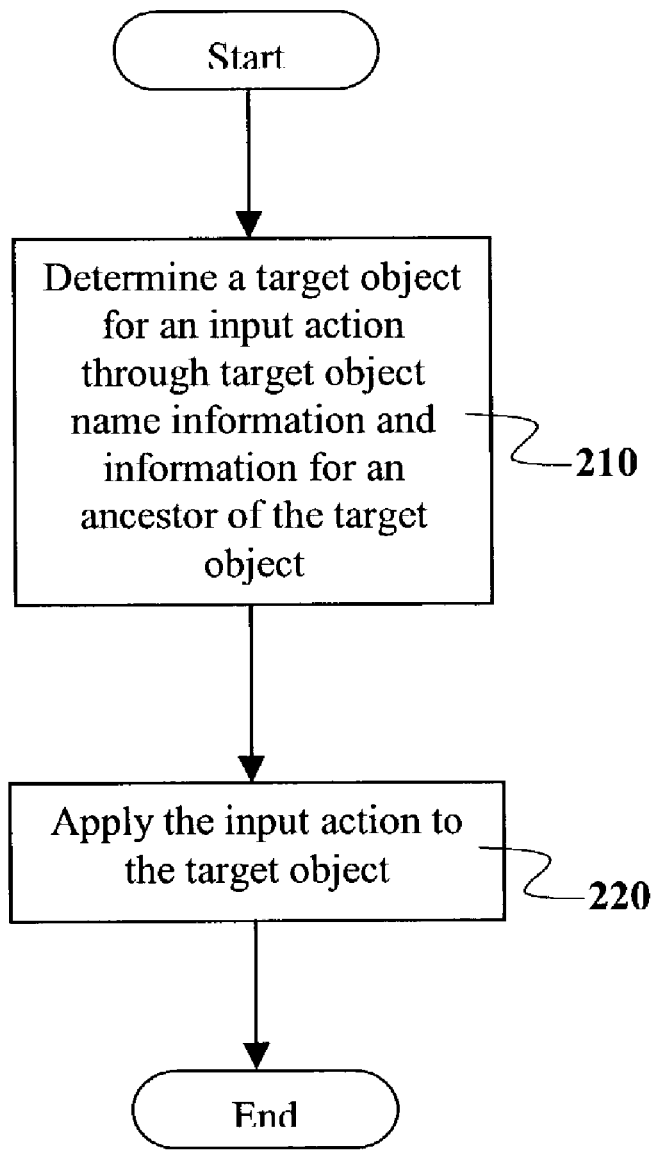
FIG. 2 illustrates a flow diagram for applying an action to a target object using name information, in accordance with one embodiment.

FIG. 2 illustrates a flow diagram for applying an action to a target object using name information, in accordance with one embodiment. In this embodiment, the socially identifying information for the target object comprises name information for an ancestor of the target object as well as name information for the target object. In this embodiment, the name information for the ancestor of the target object provides a starting object, or reference object, for determination of the target object. That is, the ancestor name is unique and searchable at a higher level within the GUI. From this ancestral object, procedural routines are utilized to identify socially connected objects. Then, the socially connected objects are also searched by name to determine the target object at 210. Upon locating the target object, the input action can be applied to the target object at 220. This approach can be used to identify a target object through multiple levels of hierarchy assuming that at least one ancestor name is known in each level of the hierarchy between the target object and the top level.

Figure 3:
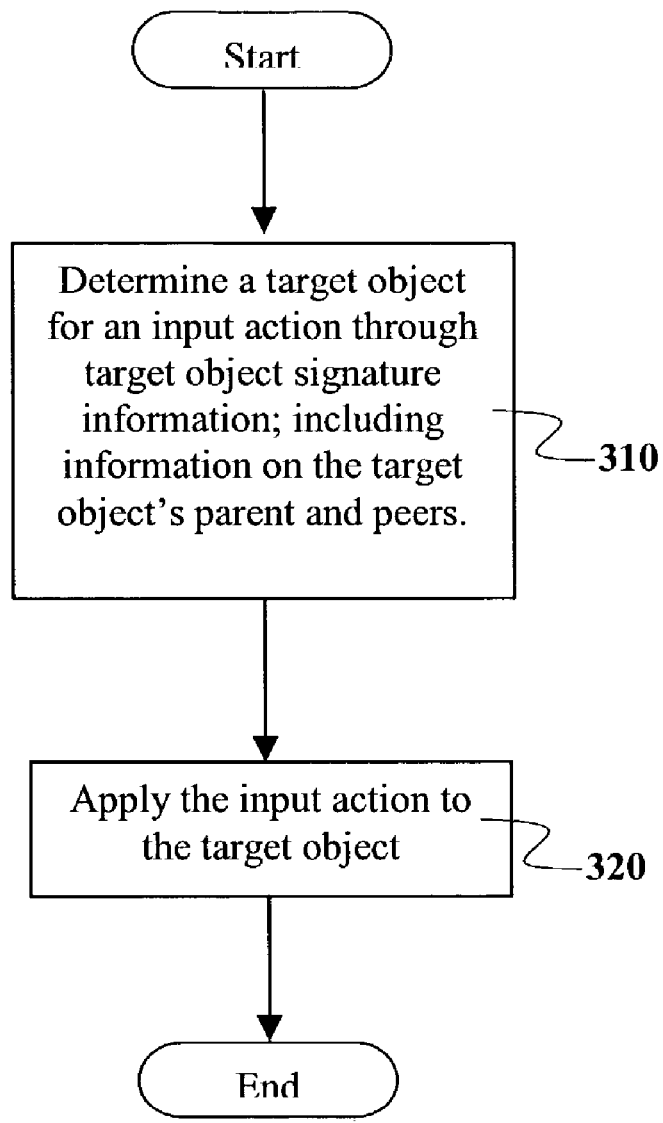
FIG. 3 illustrates a flow diagram for applying an action to a target object using signature information, in accordance with one embodiment.

FIG. 3 illustrates a flow diagram for applying an action to a target object using signature information, in accordance with one embodiment. In various embodiments, signature information uniquely identifies a target object in terms of ancestors, descendents, and/or peers without relying on a name for the target object. Signature-based identification is desirable when a target object has no name, or no unique name, from which to identify the target object. For example, a target object may be described starting from an ancestor reference object and then tracing down through one or more levels of GUI hierarchy to the level of the target object. In one embodiment, the signature includes the name of the target object's parent and location information for the target object relative to other peer objects and/or descendents. In one embodiment, peer objects are those objects that depend from the same parent object and occur in the same level of the hierarchy as the target object, and descendent objects are those that descend from the target object into a next lower level of the hierarchy.

In any case, once the immediate parent object has been identified, peer objects can be examined and, using the peer location information, the target object can be determined from its relationship to the peers as identified by the signature information, at 310. For example, a peer object, identifiable by name, may have a particular spatial orientation with respect to the target object. This spatial orientation may be used to identify the target object to the left or right of the peer object by checking the location of each object. In another embodiment, an unnamed target object is identified by having specific information regarding the target object's "rank" among other unnamed objects. In various embodiments, peers are ranked by spatial distance from a parent, by location within a parent based on a predefined pattern, or by any other objective means. Once the target object has been identified by the signature information, an input action is applied to the target object, at 320.

When determining a target component, the use of names to fully identify a target component relative to a top level component may not be possible. There may be missing links in terms of unnamed components in the hierarchical chain. Signature-based identification can also be used to identify these "missing links" in an ancestral chain leading to a particular target object. For instance, the name of the target object may be known, and the name of the top-level grandparent of the target object may be known, but the parent of the target object between the top-level grandparent and the target object may not have a name, or may not have an unique name, or the name may simply be unknown. In any case, the parent object can be uniquely identified by signature information. For instance, the signature could be based on the position of the parent with respect to the grandparent, the position of the parent with respect to one or more of its peers, or any other objective standard. In various embodiments, an entire hierarchical chain leading to a target object can be defined in terms of signature information, name information, or a combination thereof.

Figure 4:
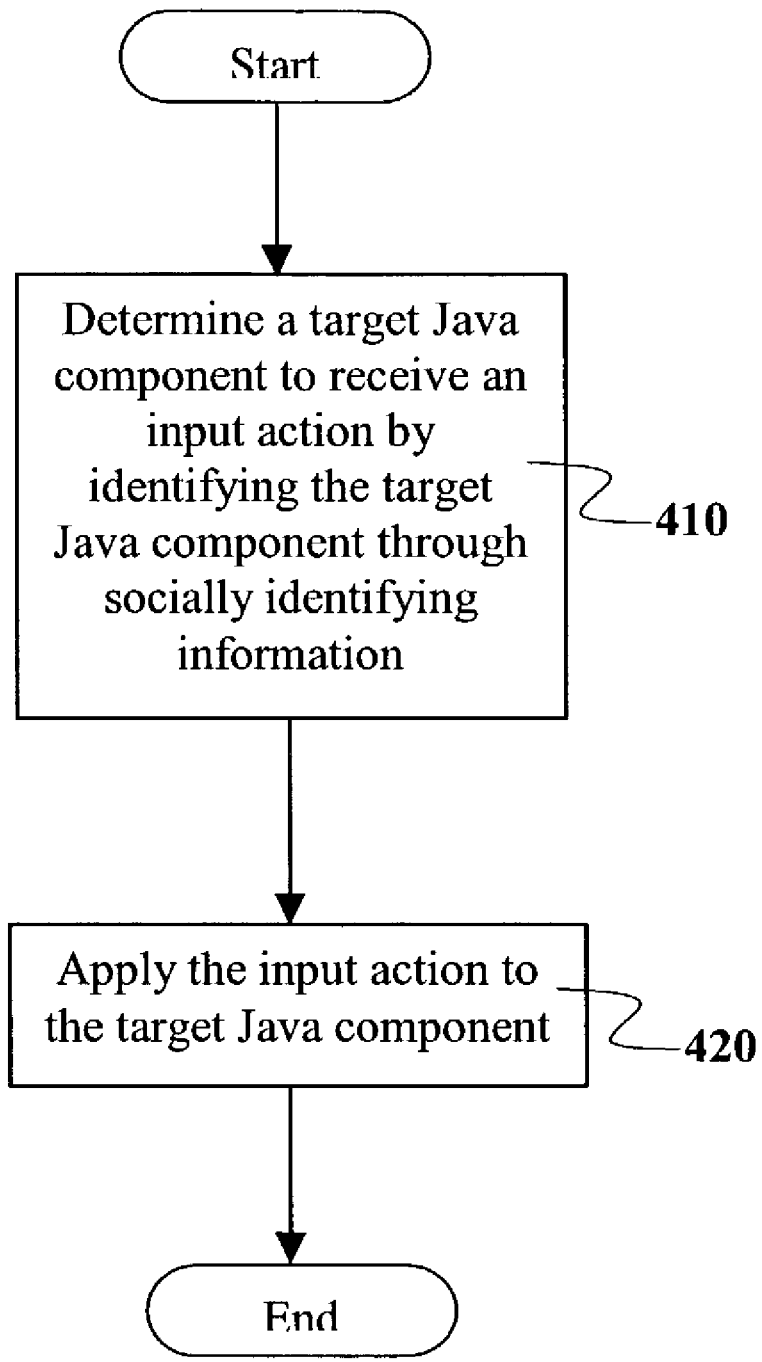
FIG. 4 illustrates a flow diagram for applying an action to a target object wherein the target object is a java component, in accordance with one embodiment.

FIG. 4 illustrates a flow diagram for applying an action to a target object wherein the target object is a java component, in accordance with one embodiment. In this embodiment, socially identifying information sufficient to identify the Java component is provided. Such socially identifying information may include parent and sibling information. Using this socially identifying information, the target Java component for an input action is identified, at 410. After the proper Java component has been identified, the input action is applied to the java component, at 420.

Figure 5:
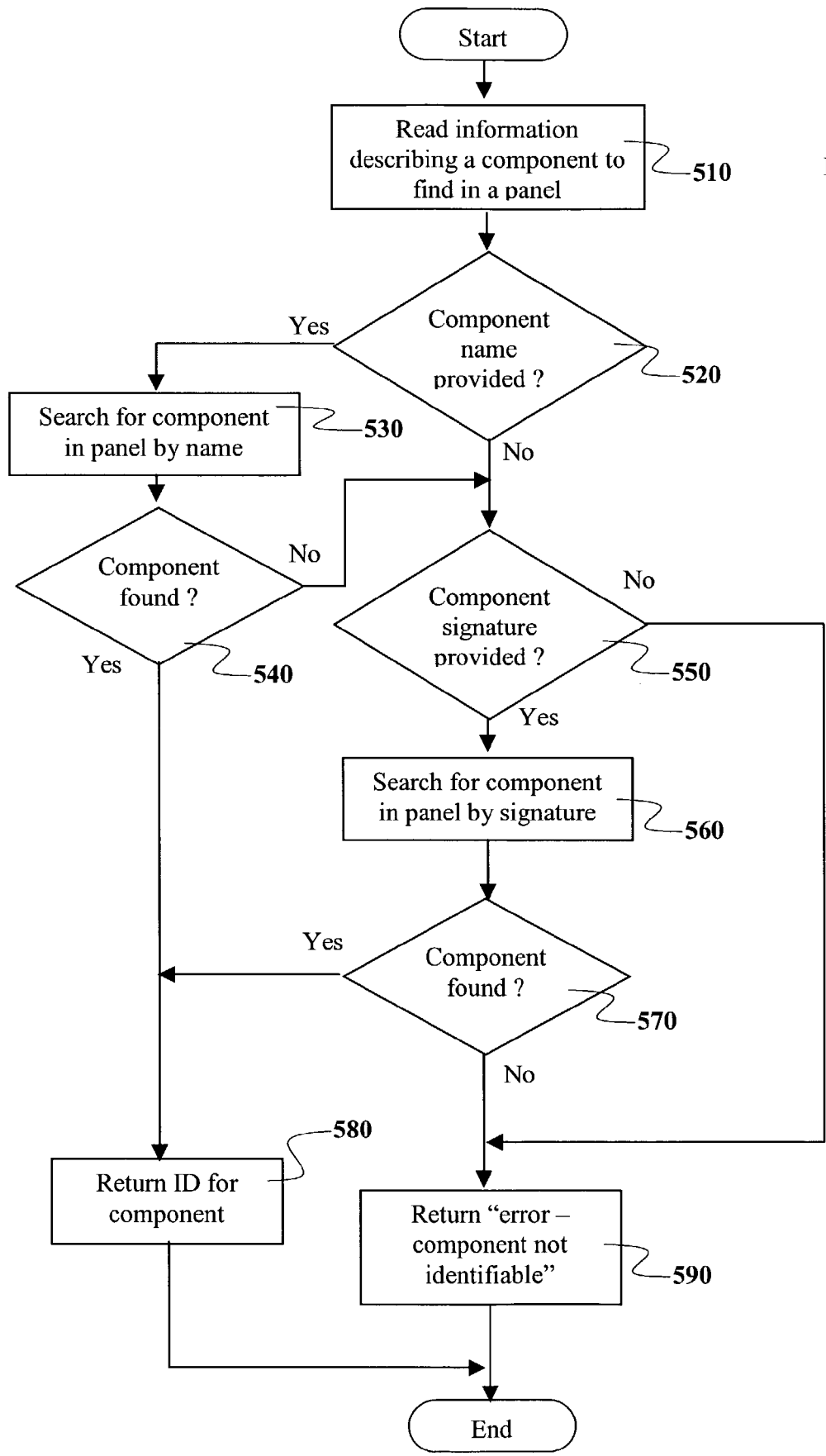
FIG. 5 illustrates a flow diagram for determining a target component for an action using both name information and signature information, in accordance with one embodiment.

FIG. 5 illustrates a flow diagram for determining a target component of an action using both name information and signature information, in accordance with one embodiment. In this embodiment, information describing a component to find in a panel is read, at 510. If name identifying information is provided in the description information, at 520, then a search is performed based upon the name information, at 530. If the component is found, then identifying information about the component is returned, at 580. However, if the name information is not provided, at 520, or if the search by name was not successful, at 540, then a check is made to determine if signature information was provided, at 550. If signature information is not provided, then an error message is returned indicating that no component was found, at 590. If the signature information is provided, at 550, then a search for the component is made based upon the signature information, at 560. If a match is made for the component using the signature information, at 570, then identifying information about the matched component is returned, at 580. Otherwise, a error message is returned indicating that no component was found, at 590. The illustrated flow can be repeated for each level of a hierarchical chain leading up to a particular target object.

Figure 6A:
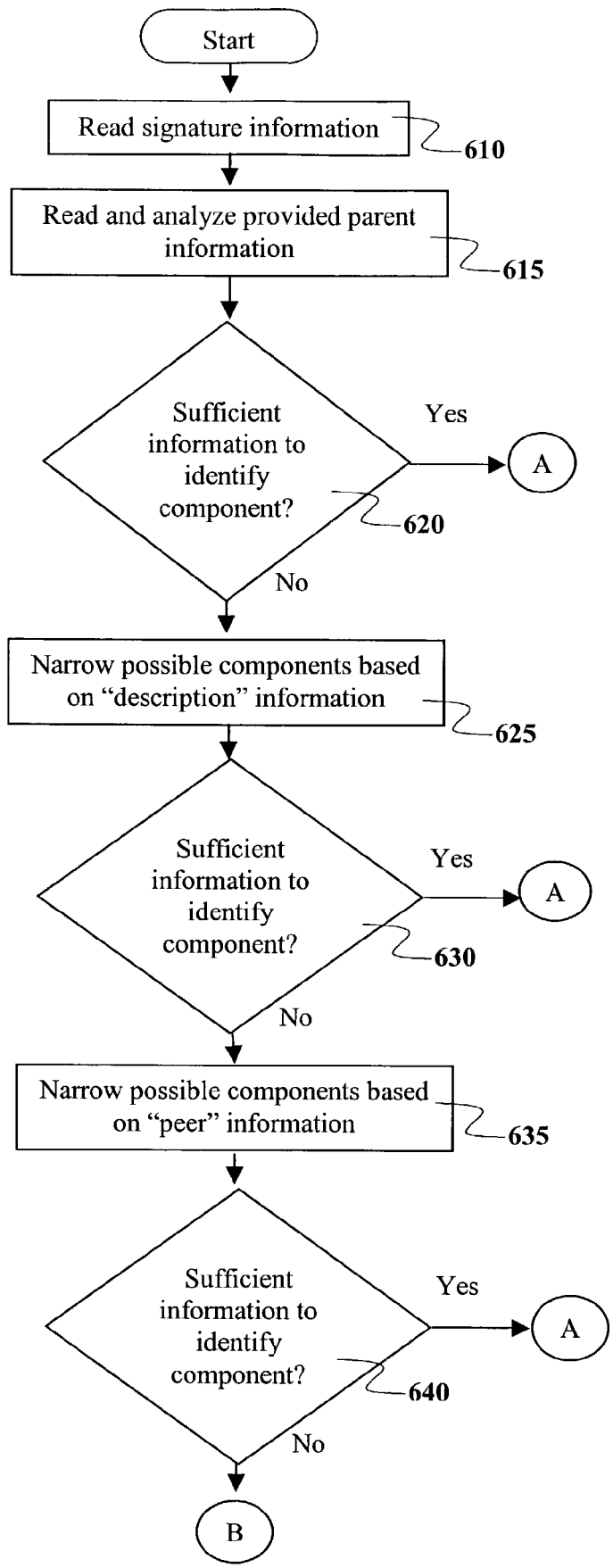
FIGS. 6A and 6B illustrate a flow diagram for searching for components using various signature aspects, in accordance with one embodiment.
Figure 6B:
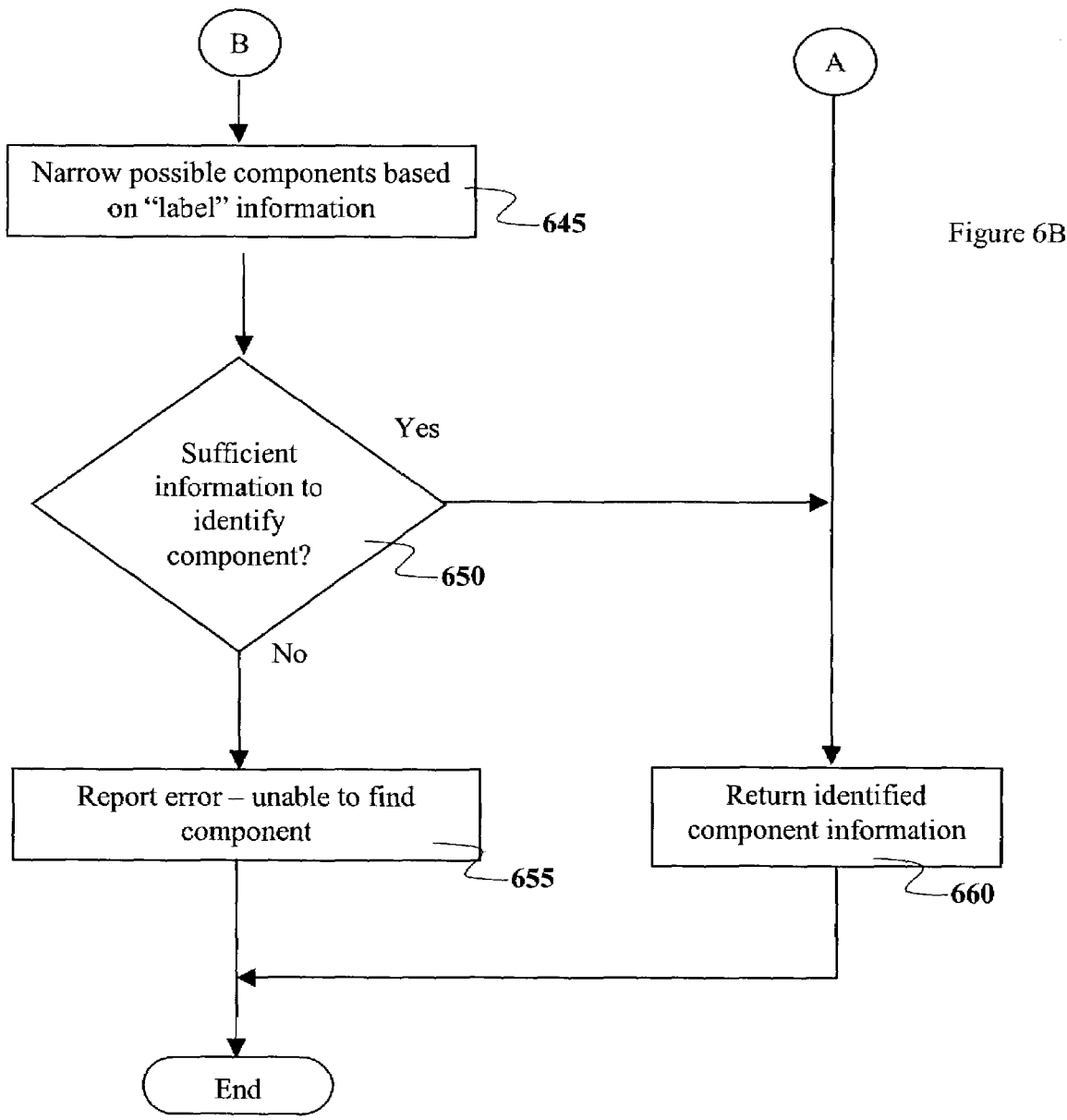

FIG. 6 illustrates a flow diagram for searching for components using various signature aspects, in accordance with one embodiment. The signature information is read for a target component, at 610. As part of the signature in this embodiment, a component type is provided. In this embodiment, several categories of information are checked, as part of the signature. First, the provided parent information is read and analyzed, at 615, to determine if the parent information is sufficient to determine the proper component, at 620. For example, if a parent has only a single component and this component matches the component type provided as part of the signature, then a component match has occurred, the proper component identification information is returned, at 660, and the identified component is then further processed as described subsequently.

If the component cannot be identified from only the parent information, then additional information is checked. In the illustrated embodiment of FIG. 6, description information is checked, at 625, if present, to determine if description information can be used to determine the proper component. Description information may include traits common to the type of component that is the target of the search. An example of description information for a label type associated with a graphical user interface component are icons. There may be a description of an icon, such as the icon name, associated with the label. Another example of description information for a component in a graphical user interface are tooltips. There may be a description of a specific tooltip string associated with a component. A search can be performed of the tooltips of components to see if a match occurs. If the component can be identified from the aggregate of the parent information and the description information, at 630, then a component match has occurred, the proper component identification information is returned, at 660 and the identified component is then further processed as described subsequently.

If, in this embodiment, the component is still not identifiable, then yet additional information is checked. The next type of information that is checked is peer information, at 635. Peer information is useful to help determine the identity of unnamed components when more than one component of the same type exists within the same parent. As an example, in the present embodiment, when multiple text fields are to be filled out in a window, multiple JTextField components may exist in a parent container. Peer information may include the number of components of the same type and a ranking among the number of components of the target component. The ranking, in this embodiment, describes the relative location from top to bottom and left to right. Thus, a component appearing above another component of the same type will have a higher rank. In this embodiment, a component at the same height but left of another component will also have a higher rank. Such a ranking can be used to distinguish between components. If the component can be identified from the aggregate of information from parent, description and peer information, at 640, then a component match has occurred, and the proper component identification information is returned, at 660. The identified component is then further processed as described subsequently.

Finally in this embodiment, if the component is not identified from the above referenced signature information, then label information is checked, at 645. Frequently, for objects with no name in a user interface, there exists a corresponding label component that will inform a user as to the desired input for the unnamed component. Examples of these label components are text labels describing the desired content of a text field or an identifying label for a radio button. In such a case, the label is likely to be unique for the given context and will have a spatial reference with respect to the desired component. If the component can be identified from the aggregate of information from parent, description, peer and label information, at 650, then a component match has occurred, and the proper component identification information is returned, at 660. The identified component is then further processed as described subsequently. Otherwise, an error is reported that the signature information provided was not sufficient to identify the component, at 655.

Figure 7:
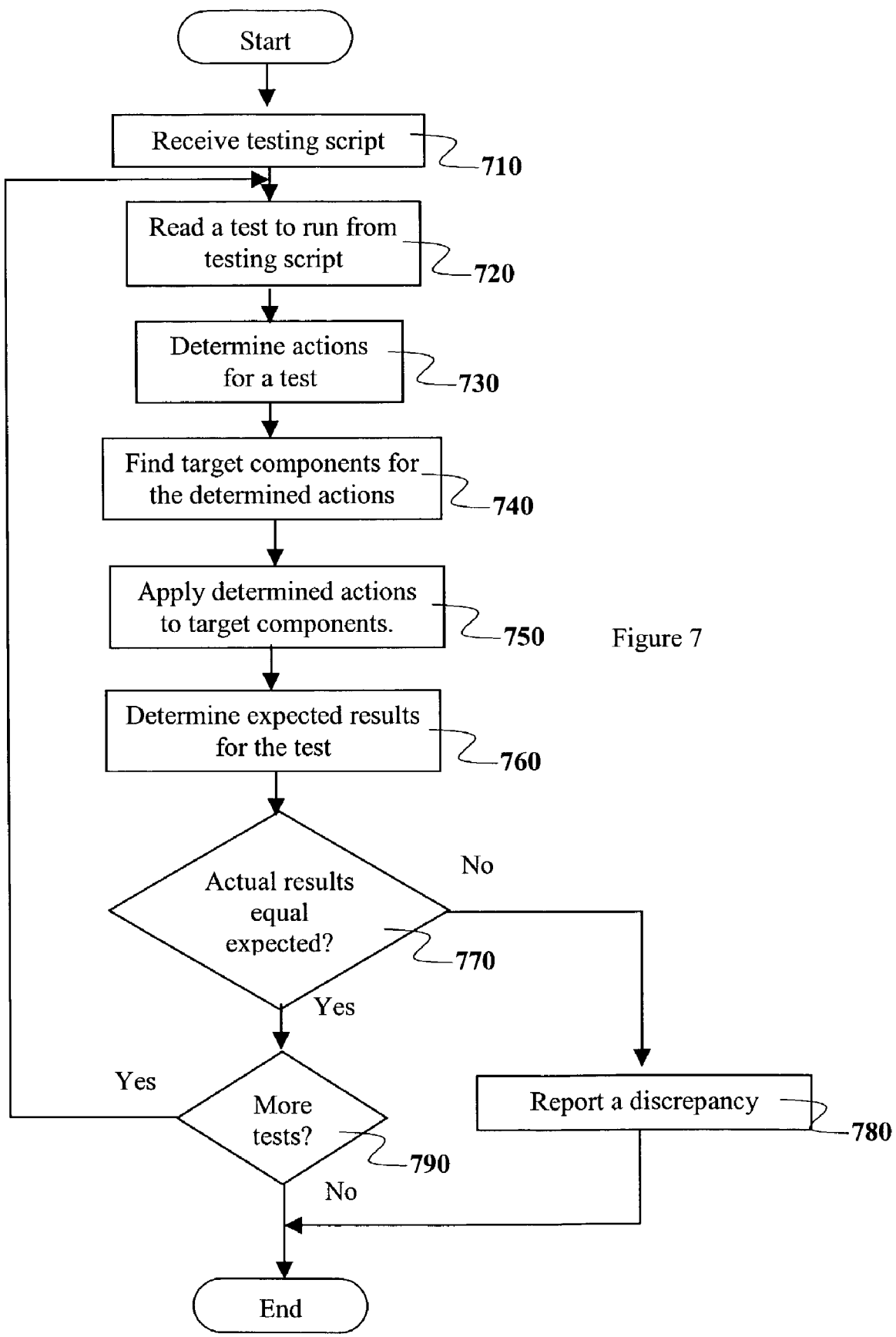
FIG. 7 illustrates a flow diagram for using the present method for testing a software application, in accordance with one embodiment.

FIG. 7 illustrates a flow diagram for using the present method for testing a software application, in accordance with one embodiment. Testing of software applications is one use for the present invention. For example, a software application can be run once interactively with a user where the user's actions are monitored. The monitoring is used to determine which components have actions applied to them. These actions and the corresponding components to which they are applied then are written to a testing script for subsequent testing of the software application. In this embodiment, a testing script is received, at 710. From the testing script, a test to be applied to the software application is parsed, at 720. From this test, a set of actions are determined, at 730. The target components for the determined actions are then found using the socially identifying information, at 740, as discussed previously. After the appropriate target components are determined for the determined set of actions, the determined actions are applied to the appropriate target components, at 750. In this embodiment, also received as part of the testing script, are details regarding the expected responses to the determined actions. From this information, an expected response can be determined, at 760. These expected responses can then be compared to the actual responses detected as a result of the actions applied to the components, at 770. If there is a discrepancy between the actual and expected responses, then the discrepancy is reported via a report file that is written, at 780. If there is no discrepancy, then a check is made to determine if there are more tests, at 790, and, if there are more test, the above sequence is repeated for a next test.

Figure 13:
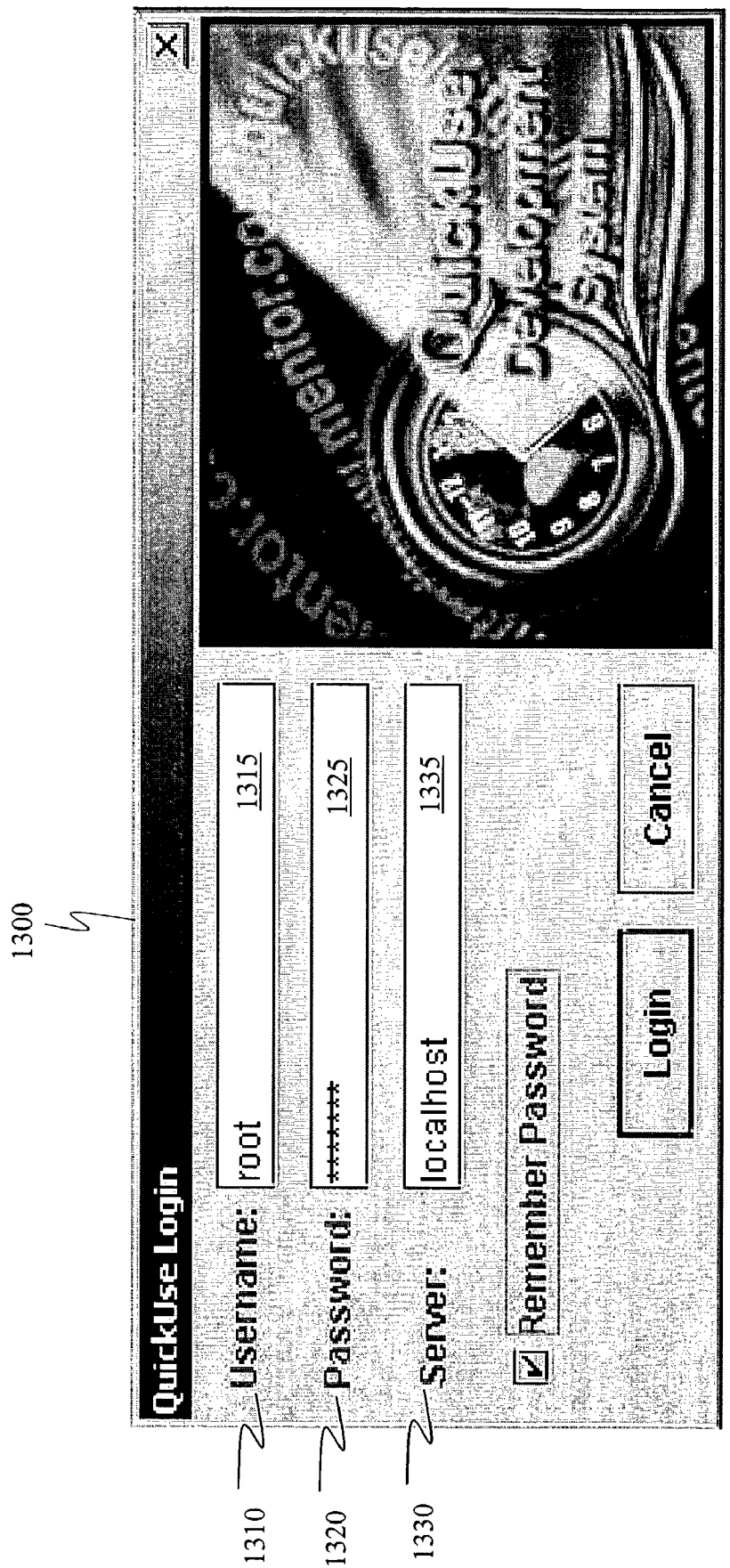
FIG. 13 illustrates a graphical user interface (GUI) window described by the exemplary script file of FIG. 8.

FIG. 8 illustrates an exemplary script file for providing the information for performing an automated interaction, in accordance with one embodiment. The format used in this exemplary script is XML, however any database format or language capable of conveying the information may be used. This script file contains identification information for a target component in an application as well as actions to be applied to those target components. FIG. 13 illustrates a graphical user interface window described by the exemplary script file of FIG. 8. In this example, a test case named Login is defined 812. The test case is to be applied to target components within a top level frame Quickuse Login 814, which is frame 1300 in FIG. 13. In this test case, there are three actions 822-826 that are to be applied to the target components in the Quickuse Login frame 1300.

The first action 822 is a keyboard input of "root" into the text entry box associated with the label "username". This text entry box is a target component of reserved Java type JTextField 832, which corresponds to field 1315, in FIG. 13. This defined action involves keyboard input, as indicated by the Key Input value in the action identifier 834. The value to be input is root as indicated by the input identifier 836. This action contains signature information, as identified by the signature tags 838, to provide identification information about the target component 1315 to which the action is applied. This signature contains three types of signature information; parent 842, peer 852 and label 862. The parent type for the target component is identified as JDialog 844. In this case, the parent type limits the possibilities of target components to only those with a parent component 1300 whose type is JDialog. The peer 852 information informs the process that there are a total of two 856 components, 1315 1335, inclusive of the target component, that are of the same type as the target component, namely type JTextField 832. A rank value of 1 854 is provided for the peer information indicating, in this embodiment, that the target component 1315 is either above the other component 1335 whose type is JTextField or, if at the same height, than it is to the left of the other component. Label signature information 862 is also provided as indicated by the "yes" value for the hasLabel field 864. Label signature information, in this embodiment, provides an indication of the location of an identifiable field 1310 relative to the target component. The labelName 866 field provides an indication of the name of the label component 1310 to whom the relative location to the target component 1315 to which this identifier is pertaining. The labelPosition 868 field provides an indication of the location of the label field 1310 relative to the target component 1315. In this case, a value of west is used to determine the relative location of the label component to the target component. From this signature information it is possible to determine the proper target component 1315. In this environment, upon determination of the correct target component identification for the action, the appropriate action is applied. In the example show in FIGS. 8 and 13, additional field and signature information is provided for inputs to two other fields 1325 1335 of type JPasswordField and JTextField, respectively.

FIG. 12 illustrates a portion of a script file in accordance with another embodiment. In this embodiment, testDomain information is used in conjunction with other information to specify the component to which an action is to be applied. In this case, the test domain information provides a hierarchical reference for at least a portion of the hierarchy from the top level component to the target component. In the embodiment shown, a Web, New, Component hierarchy exists as indicated by the value 1204 associated with the testDomain variable for the action 1202. The difference between using this test domain information and providing an ability to get a component based upon the component name is that, in the later case, the component name must be unique. In comparison, the test domain provides information about hierarchies that may contain a missing hierarchy. Thus, in the example provided, Web is a higher level component than New, which is a higher level component than Component. However, between each of these, there may be additional hierarchy levels. In one embodiment, if there are containers in the hierarchy without name information, all containers will be enumerated and exhaustively searched for a component, which fits the testDomain description. For example, in the hierarchy web|new|component, supposed there is an unnamed container between "new" and "component". In this embodiment, after all containers have been enumerated, a search will be performed for all containers matching web|new|"unnamed"|component or web|new|"unnamed"|"unnamed"|component. Where "unnamed" means that there is a container which does not have a name/text. Upon finding the component as identified, the search will stop and the component will have the proper action applied to it.

Input Data

Once an object has been properly identified, its location on a display device can be identified. Using this identified location, the input can be applied. As mentioned, an advantage of the present method over previous pixel based methods, lies in the identification of the components and then, for the given system, obtaining the position of the appropriate input location is performed through the appropriate interaction with the system. For example, in one embodiment, once a component in a java operating environment has been identified, methods inherent to the component can be used to determine the component's location. Specifically, in this embodiment, the getLocationOnScreen( ) routine can be called to identify a location on a screen. The getLocationOnScreen routine returns to the caller the absolute location where the bounding box for the component is located on the screen. As previously noted, if pixel information is provided as an indicia of the location for applying an input action, when changing between platforms for screen types, the pixel information may likely be an incorrect indicia of the proper input location for the action. In this embodiment, by utilizing the getLocationOnScreen, the coordinates of the desired location are provided independent of the hardware platform or any other variable.

Testing Suites

As described above, test cases are utilized for performing actions on components. As seen in the example associated with FIG. 8, in a test case, multiple actions can be applied to multiple components in a panel. By combining multiple test cases, a test suite can be developed. FIG. 9 shows an exemplary testing suite that is comprised of multiple test cases. In the test suite shown, several test cases are run simulating various input actions from a user. The test cases shown lead an application, in the automated method previously discussed, through the process of logging in 910, creating a new component 920, reopening an existing component 930, performing a search 940 and then exiting the tool 950.

Figure 10A:
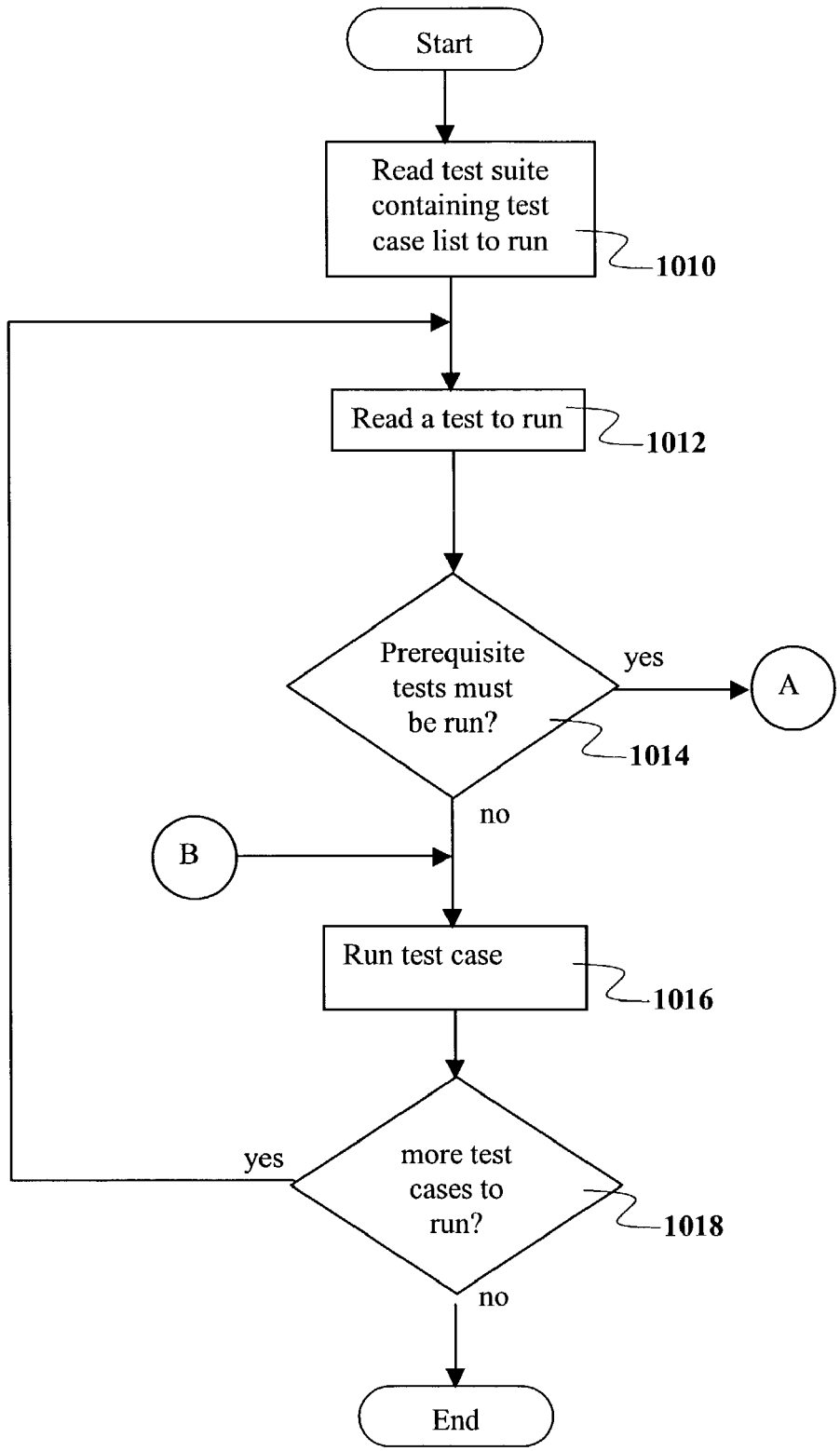
FIGS. 10A and 10B illustrate a flow diagram describing the processing of a test suite in accordance with one embodiment.
Figure 10B:
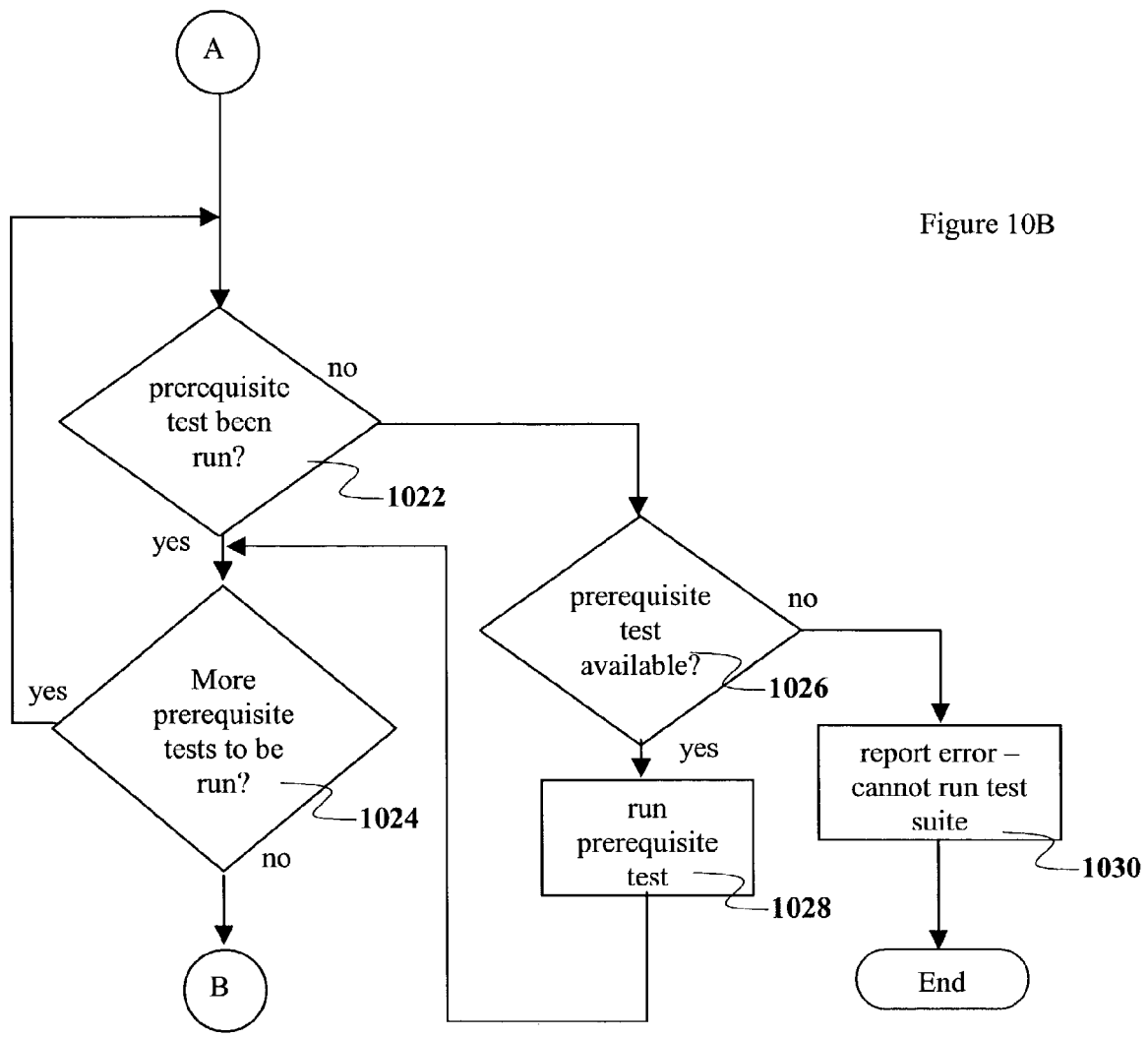

FIG. 10 shows a flow diagram describing the processing of a test suite in accordance with one embodiment. The list of test cases to be run are read from a test suite, at 1010. A first test from the suite is read from the list, at 1012, and prepared for running. Next, for the given test case, a check is made to determine if there are any unqualified dependencies, at 1014. As an example, FIG. 11 shows a test suite beginning with a first test being a New Component 1120. For a given test case, a determination is made as to whether any other test cases must be run prior to running of the current test. FIG. 12 shows a portion of a New Component test case. As is shown, the test has a dependency 1210 upon a test named Login. A check is made to determine if this test has been run prior to this point, at 1022, in FIG. 10. If the test has been run, then a check is made for other tests, at 1024. If the test has not be run, then a check is made to determine if the prerequisite test is available to the process for running, at 1026. If the test is available, the test is run, at 1028, and then checks are made for other possible prerequisite tests. If the test is not available, then the process reports an error that it cannot run the test suite as there is an unqualified dependency, at 1030. After successfully checking the dependencies, the test case is run, at 1016. A check is made to determine if more tests are to be run, at 1018, and, if so, then the process is repeated for the remaining test cases.

Exemplary Operating Environment

Figure 14:
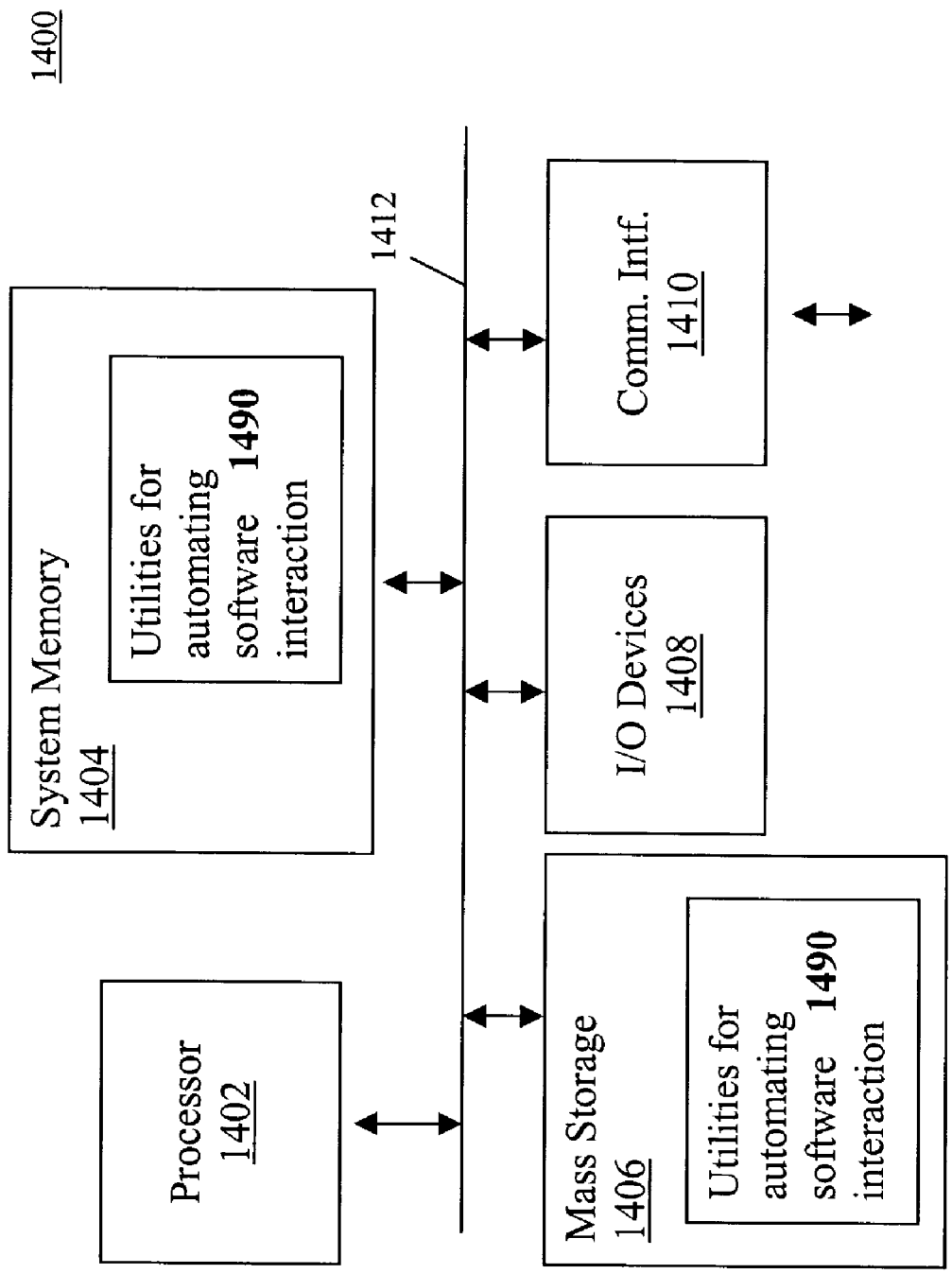
FIG. 14 illustrates one embodiment of a computing apparatus suitable for use to practice the present invention.

FIG. 14 illustrates one embodiment of a computing apparatus suitable for use to practice the present invention. As shown, for the illustrated embodiment, computing device 1400 includes processor 1402 and processor bus 1412. Coupled to processor bus 1412 are system memory 1404, communication interface 1410, I/O devices 1404 and mass storage 1406. I/O devices 1410 include a graphical device for displaying the components as discussed herein.

These elements perform their conventional functions known in the art. In particular, mass storage 1406 and system memory 1414 are used to store permanent and working copies of the utilities to perform the automated software interaction. The permanent copy may be pre-loaded into mass storage 1406 in a factory, loaded from distribution medium (not shown), or downloaded from a remote distribution source (not shown). Distribution medium may be a tape, a CD, a DVD or other storage medium of the like. The constitutions of these elements are known. Any one of a number of implementations of these elements known in the art may be used to form computer system 1400.

Certain embodiments may include additional components, may not require all of the above components, or may combine one or more components. Those skilled in the art will be familiar with a variety of alternative implementations.

CONCLUSION

Embodiments of the present invention provide a method of automating interactions with a graphical user interface. Actions are applied to an object in the graphical user interface by identifying the target object through socially identifying information and applying an action to the identified object.

By identifying a component through identifying information and applying the action based upon this information, the actions can be repeatedly and successfully applied at the specific pixel locations of the target object even as the pixel locations change from application to application, and from platform to platform. This allows the playback method to be used on different computers without error in contrast to prior art pixel-based methods that potentially apply input actions outside the pixel location of the target object as the pixel location of the target object changes.

The present invention can be embodied in the form of methods as well as apparatuses for practicing those methods. The present invention can also be embodied in the form of program code embodied in tangible media, such as punched cards, magnetic tape, floppy disks, hard disk drives, CD-ROMs, flash memory cards, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented upon a general-purpose processor, the program code segments combine with the processor to provide a unique device that operates analogously to specific logic circuits.

It is to be understood that the present invention is not limited to the embodiments described above, but encompasses any and all embodiments within the scope of the subjoined claims.

What is claimed:

1. One or more computer-readable storage media comprising instructions configured to cause a computer to perform a method, the method comprising:

reading signature information for a target component in a graphical user interface (GUI);

attempting to locate the target component in the GUI based at least in part on parent information for the target component, wherein the signature information comprises the parent information;

making a first determination by determining that the parent information is insufficient to locate the target component in the GUI;

as a result of the first determination, attempting to locate the target component in the GUI based at least in part on component description information;

making a second determination by determining that the component description information is insufficient to locate the target component in the GUI;

as a result of the second determination, attempting to locate the target component in the GUI based at least in part on peer component information, wherein the peer component information comprises a description of one or more components in the GUI having a same component type as the target component;

making a third determination by determining that the peer component information is insufficient to locate the target component in the GUI; and as a result of the third determination, attempting to locate the target component based at least in part on a description of a label component associated with the target component, wherein the label component is configured to be displayed in the GUI.

2. The one or more computer-readable storage media of claim 1, wherein the component description information comprises a description of an icon associated with the target component.

3. The one or more computer-readable storage media of claim 1, wherein the component description information comprises a description of a tooltip associated with the target component.

4. The one or more computer-readable storage media of claim 1, wherein the label component is configured to be displayed in the GUI as spaced apart from the target component.

5. A method comprising:

reading, using a computer, signature information for a target component in a graphical user interface (GUI);

attempting, using the computer, to locate the target component in the GUI based at least in part on parent information for the target component, wherein the signature information comprises the parent information;

making, using the computer, a first determination by determining that the parent information is insufficient to locate the target component in the GUI;

as a result of the first determination, attempting, using the computer, to locate the target component in the GUI based at least in part on component description information;

making, using the computer, a second determination by determining that the component description information is insufficient to locate the target component in the GUI;

as a result of the second determination, attempting, using the computer, to locate the target component in the GUI based at least in part on peer component information, wherein the peer component information comprises a description of one or more components in the GUI having a same component type as the target component;

making, using the computer, a third determination by determining that the peer component information is insufficient to locate the target component in the GUI; and as a result of the third determination, attempting, using the computer, to locate the target component based at least in part on a description of a label component associated with the target component, wherein the label component is configured to be displayed in the GUI.

6. The method of claim 5, wherein the component description information comprises a description of an icon associated with the target component.

7. The method of claim 5, wherein the component description information comprises a description of a tooltip associated with the target component.

8. The method of claim 5, wherein the label component is configured to be displayed in the GUI as spaced apart from the target component.

9. A system comprising:

a processor; and one or more computer-readable storage media comprising instructions configured to cause the processor to perform a method, the method comprising, reading signature information for a target component in a graphical user interface (GUI), attempting to locate the target component in the GUI based at least in part on parent information for the target component, wherein the signature information comprises the parent information, making a first determination by determining that the parent information is insufficient to locate the target component in the GUI, as a result of the first determination, attempting to locate the target component in the GUI based at least in part on component description information, making a second determination by determining that the component description information is insufficient to locate the target component in the GUI, as a result of the second determination, attempting to locate the target component in the GUI based at least in part on peer component information, wherein the peer component information comprises a description of one or more components in the GUI having a same component type as the target component, making a third determination by determining that the peer component information is insufficient to locate the target component in the GUI, and as a result of the third determination, attempting to locate the target component based at least in part on a description of a label component associated with the target component, wherein the label component is configured to be displayed in the GUI.

10. The system of claim 9, wherein the component description information comprises a description of an icon associated with the target component.

11. The system of claim 9, wherein the component description information comprises a description of a tooltip associated with the target component.

12. The system of claim 9, wherein the label component is configured to be displayed in the GUI as spaced apart from the target component.

* * * * *